(12) United States Patent
Li (10) Patent No.: US 6,384,605 B1
(45) Date of Patent: May 7, 2002

(54) METHOD AND APPARATUS FOR MEASUREMENT OF BOREHOLE SIZE AND THE RESISTIVITY OF SURROUNDING EARTH FORMATIONS

(75) Inventor: Qiming Li, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/393,559

(22) Filed: Sep. 10, 1999

(51) Int. Cl.$^7$ .............................. G01V 3/18; G01V 3/00
(52) U.S. Cl. ............................ 324/338; 324/369; 702/7
(58) Field of Search ................................. 324/368, 342, 324/366, 339, 340, 341, 355, 356, 367, 369; 250/254; 181/102; 702/11, 12, 13, 10, 6, 7

(56) References Cited

U.S. PATENT DOCUMENTS

| | | |
|---|---|---|
| 4,407,157 A | 10/1983 | Lichtenberg |
| 4,899,112 A | 2/1990 | Clark et al. |
| 5,235,285 A | 8/1993 | Clark et al. |
| 5,339,036 A | 8/1994 | Clark et al. |
| 5,339,037 A | 8/1994 | Bonner et al. |
| 5,397,893 A | 3/1995 | Minette |
| 5,463,320 A | 10/1995 | Bonner et al. |
| 5,469,736 A | 11/1995 | Moake |
| RE35,386 E | * 12/1996 | Wu et al. ................ 175/45 |
| 5,886,303 A | 3/1999 | Rodney |
| 5,900,733 A | 5/1999 | Wu et al. |

OTHER PUBLICATIONS

Bonner, S. et al., "A New Generation of Electrode Resistivity Measurements for Formation Evaluation While Drilling", SPWLA 35$^{th}$ Annual Logging Symposium, Jun. 19–22, 1994, Paper OO.

\* cited by examiner

Primary Examiner—Walter Snow
(74) Attorney, Agent, or Firm—Victor H. Segura (57) ABSTRACT

A method and apparatus for determining the size or diameter of boreholes extending to a wide range of dimensions and/or the resistivity of the surrounding earth formations utilizing a well tool disposed in the borehole. The method involves generating model data representative of the well tool responses to different borehole diameters contrasted with formation and borehole fluid resistivity values, determining the borehole fluid resistivity, transmitting electromagnetic energy into the formation, measuring the energy shed back into the borehole at arbitrary sensor stations on the tool and generating resistivity signal data associated with the measured energy, and matching the signal data and the fluid resistivity against the modeled response data to determine the borehole caliper and/or formation resistivity. The apparatus forms part of a system for calculating a borehole caliper and/or the surrounding formation resistivity. The apparatus being coupled to a multi-sensor well tool and adapted to respond to signal data generated by the tool. The apparatus further adapted to receive the signal data; to receive a borehole fluid parameter; to store modeled well tool response data; and to process the signal data, the fluid parameter, and the modeled data to determine the borehole caliper and/or formation resistivity.

36 Claims, 8 Drawing Sheets

METHOD AND APPARATUS FOR MEASUREMENT OF BOREHOLE SIZE AND THE RESISTIVITY OF SURROUNDING EARTH FORMATIONS

BACKGROUND OF THE INVENTION

1. Field of the Invention

This invention relates generally to a method and apparatus for measuring a borehole and the surrounding earth formations and, more particularly, to a technique for calculating the diameter of a borehole and the formation resistivity from electromagnetic ("EM") measurements obtained with a well tool. The invention has general application in the well logging art, but is particularly useful in measuring-while-drilling.

2. Description of Related Art

In order to improve oil and gas drilling and production operations, it is necessary to gather as much information as possible on the properties of the underground earth formation as well the environment in which drilling takes place. Such properties include characteristics of the earth formations traversed by a well borehole, in addition to data on the size and configuration of the borehole itself. Among the characteristics of the earth formation of interest to drillers and petrophysicists is the resistivity of the rock or strata surrounding the borehole. However, the processes often employed to measure these characteristics are subject to significant errors unless information on the borehole size and configuration is also taken into account in their determination. Knowledge of the borehole size is also useful to estimate the hole volume, which, in turn, is used to estimate the volume of cement needed for setting casing or when hole stability is of concern during drilling.

The collection of downhole information, also referred to as logging, is realized in different ways. A well tool, comprising transmitting and detecting devices for measuring various parameters, can be lowered into the borehole on the end of a cable, or wireline. The cable, which is attached to some sort of mobile processing center at the surface, is the means by which parameter data is sent up to the surface. With this type of wireline logging, it becomes possible to measure borehole and formation parameters as a function of depth, i.e., while the tool is being pulled uphole.

An improvement over wireline logging techniques is the collection of data on downhole conditions during the drilling process. By collecting and processing such information during the drilling process, the driller can modify or correct key steps of the operation to optimize performance and avoid financial injury due to well damage such as collapse or fluid loss. Formation information collected during drilling also tends to be less affected by the mud fluid invasion processes or other undesirable influences as a result of borehole penetration, and therefore are closer to the properties of the virgin formation.

Schemes for collecting data of downhole conditions and movement of the drilling assembly during the drilling operation are known as measurement-while-drilling ("MWD") techniques. Similar techniques focusing more on measurement of formation parameters than on movement of the drilling assembly are know as logging-while-drilling ("LWD"). However, the terms MWD and LWD are often used interchangeably, and the use of either term in the present disclosure should be understood to include both the collection of formation and borehole information, as well as data on movement of the drilling assembly.

It is known in the art to measure the diameter, also known as the caliper, of a borehole to correct formation measurements that are sensitive to size or standoff. These corrections are necessary for accurate formation evaluation. U.S. Pat. No. 4,407,157 describes a technique for measuring a borehole caliper by incorporating a mechanical apparatus with extending contact arms that are forced against the sidewall of the borehole. This technique has practical limitations. In order to insert the apparatus in the borehole, the drillstring must be removed, resulting in additional cost and downtime for the driller. Such mechanical apparatus are also limited in the range of diameter measurement they provide.

Due to the unsuitability of mechanical calipers to drilling operations, indirect techniques of determining borehole calipers have been proposed. Conventional caliper measurement techniques include acoustic transducers that transmit ultrasonic signals to the borehole wall. U.S. Pat. No. 5,469,736 describes an apparatus for measuring the caliper of a borehole by transmitting ultrasonic signals during a drilling operation. U.S. Pat. No. 5,397,893 describes a method for analyzing formation data from a MWD tool incorporating an acoustic caliper. U.S. Pat. No. 5,886,303 describes a logging tool including an acoustic transmitter for obtaining the borehole caliper while drilling. However, the techniques proposed with acoustic calipers entail measurements employing standoff and travel time calculations, resulting in data of limited accuracy. Sound wave reflections in soft formations may also be too weak to be accurately detected, leading to loss of signals.

U.S. Pat. No. 4,899,112 (assigned to the assignee of the present invention) discloses a technique for determining a borehole caliper and formation resistivities from downhole measurements obtained with a well tool. This technique determines the borehole caliper and formation resistivity by computing phase differences and attenuation levels from measured data. U.S. Pat. No. 5,900,733 (assigned to the assignee of the present invention) discloses a technique for determining borehole fluid resistivities and diameters by examining the phase shift, phase average, and attenuation of signals from multiple transmitter and receiver locations via electromagnetic wave propagation. However, the disclosed technique is limited to a well tool of wave propagation type incorporating multiple transmitter means with particular spacing conditions. The disclosed technique is also limited in application to boreholes of limited diameters.

An emerging application of borehole caliper measurements, which is not geared towards formation evaluation, is the monitoring of borehole stability while drilling. Keeping track of the dynamic development of the borehole is critical for the successful completion of a well when borehole stability is of issue. In some instances, the borehole has been severely washed out with diameters in excess of seventy inches. This requires a borehole caliper measurement technique that works for a wide range of hole sizes. Not only should the caliper measurement indicate a large hole when severe washout occurs, it should also provide an accurate estimate of the required cement volume for casing upon completion of the well.

It is desirable to obtain a simplified method and system for accurately determining a borehole caliper and the surrounding formation resistivity utilizing EM measurements from a well tool. Still further, it is desired to implement a borehole caliper and formation resistivity calculation technique that works for a wide range of borehole sizes.

SUMMARY OF THE INVENTION

A method and system are provided for determining a caliper of a borehole and/or the resistivity of the surrounding earth formations utilizing a well tool disposed in the borehole. In one aspect of the invention, a process for determining the caliper of a borehole comprises modeling responses of the well tool at different borehole and formation parameters; determining a known borehole fluid parameter; transmitting electromagnetic energy into the borehole from a station on the tool; receiving electromagnetic energy at arbitrary multiple sensor stations on the tool; generating signal data, associated with the received energy, from the tool; recording downhole and/or transmitting the signal uphole; and matching the signal data and the known borehole fluid parameter against the modeled responses to determine the borehole caliper.

In another aspect of the invention, a process for determining the resistivity of an earth formation is provided. This process is similar to the process provided for determining a caliper of a borehole, with minor variations.

In another aspect of the invention, a borehole caliper/formation resistivity calculation system, including a multi-sensor well tool and an apparatus, is provided. The apparatus is adapted to be coupled to the well tool, the tool being disposed in a borehole in an earth formation and adapted to transmit EM energy into the formation from a tool station and to receive EM energy at arbitrary multiple tool sensor stations. The apparatus is further adapted to respond to signal data, generated by the tool and associated with the received energy, for determining the borehole caliper and/or formation resistivity. The apparatus comprises means for receiving the signal data; means for receiving a known borehole fluid parameter; means for generating and storing modeled well tool response data; and means for processing the signal data, the known fluid parameter, and the modeled response data to determine the borehole caliper and/or formation resistivity.

BRIEF DESCRIPTION OF THE DRAWINGS

Other aspects and advantages of the invention will become apparent upon reading the following detailed description and upon reference to the drawings in which.

DETAILED DESCRIPTION OF SPECIFIC EMBODIMENTS

In the interest of clarity, not all features of actual implementation are described in this specification. It will be appreciated that although the development of any such actual implementation might be complex and time-consuming, it would nevertheless be a routine undertaking for those of ordinary skill in the art having the benefit of this disclosure.

Figure 1:
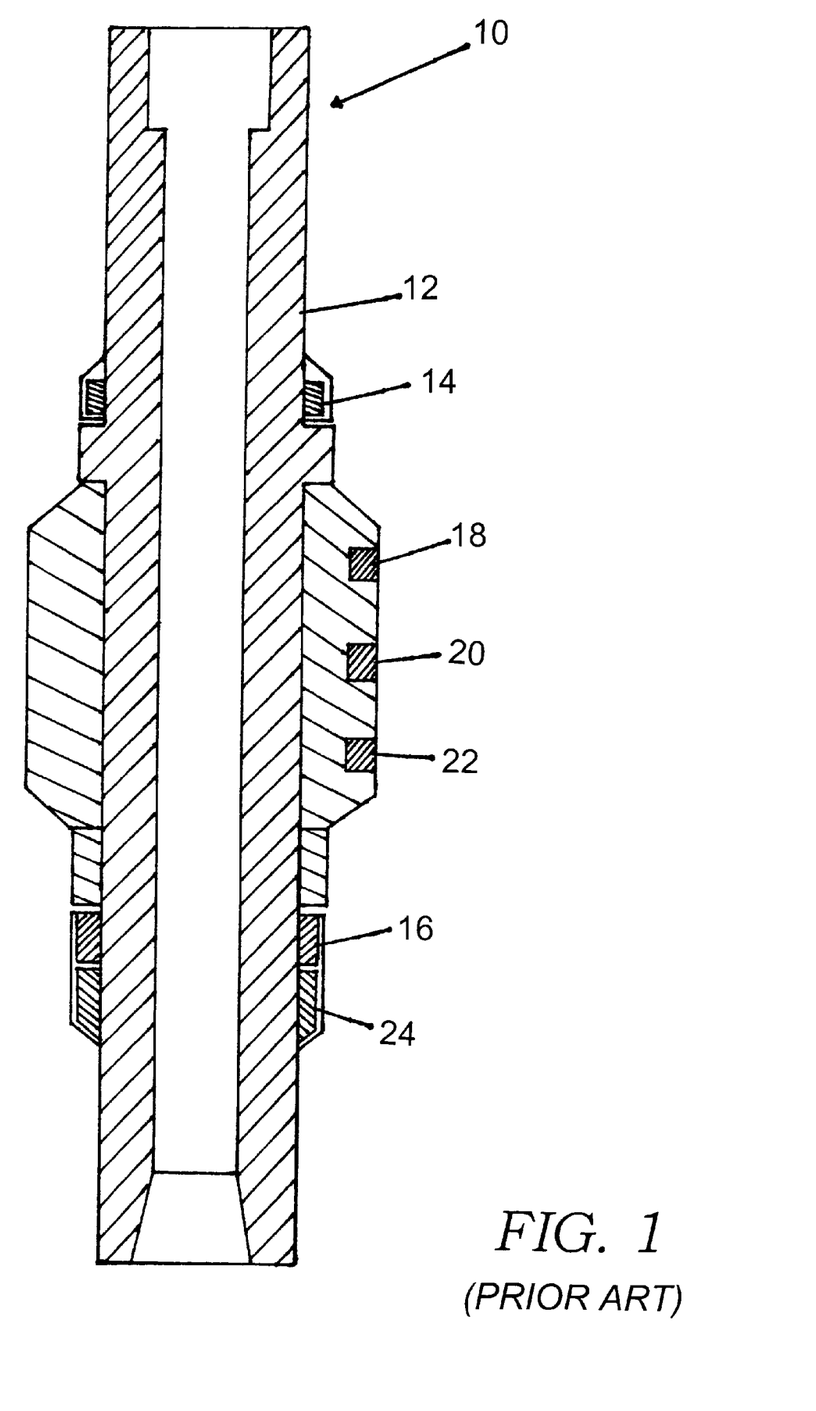
FIG. 1 is a cross-sectional view of a well tool embodiment, as described in U.S. Pat. No. 5,339,037, which may be used to implement the present invention.

The present invention utilizes EM measurements to calculate a borehole caliper extending to a wide range of diameters and the resistivity of the surrounding formations. U.S. Pat. Nos. 5,235,285, 5,339,036, 5,339,037 and 5,463,320 (all assigned to the assignee of the present invention) disclose embodiments of well tools that can be used to implement the present invention in the manner of operation described in the respective patent. FIG. 1 is representative of such tool embodiments.

As seen in FIG. 1, one embodiment of the tool 10 includes a section of tubular drill collar 12 having mounted thereon a transmitter antenna 14, a receiving antenna 16, receiving button sensors 18, 20, 22 and a ring sensor 24. [In the present disclosure, any references to a sensor are intended to encompass an electrode, and vice-versa.] In the illustrated apparatus, the transmitting antenna 14 comprises a toroidal antenna having coil turns wound on a ferromagnetic toroidal core that is axially coincident with the axis of the drill collar 12. The purpose of this toroidal transmitter is to induce a voltage along the drill collar 12 between sections above and below the transmitter 14. The resultant current travels in a path that includes the drill string (not shown) and the formations (as well as the borehole fluid, which is assumed to have substantial conductivity). It will be understood that the present invention may be implemented with a well tool 10 comprising more or fewer sensors, receivers, or transmitters than are shown in the embodiment of FIG. 1.

Figure 2:
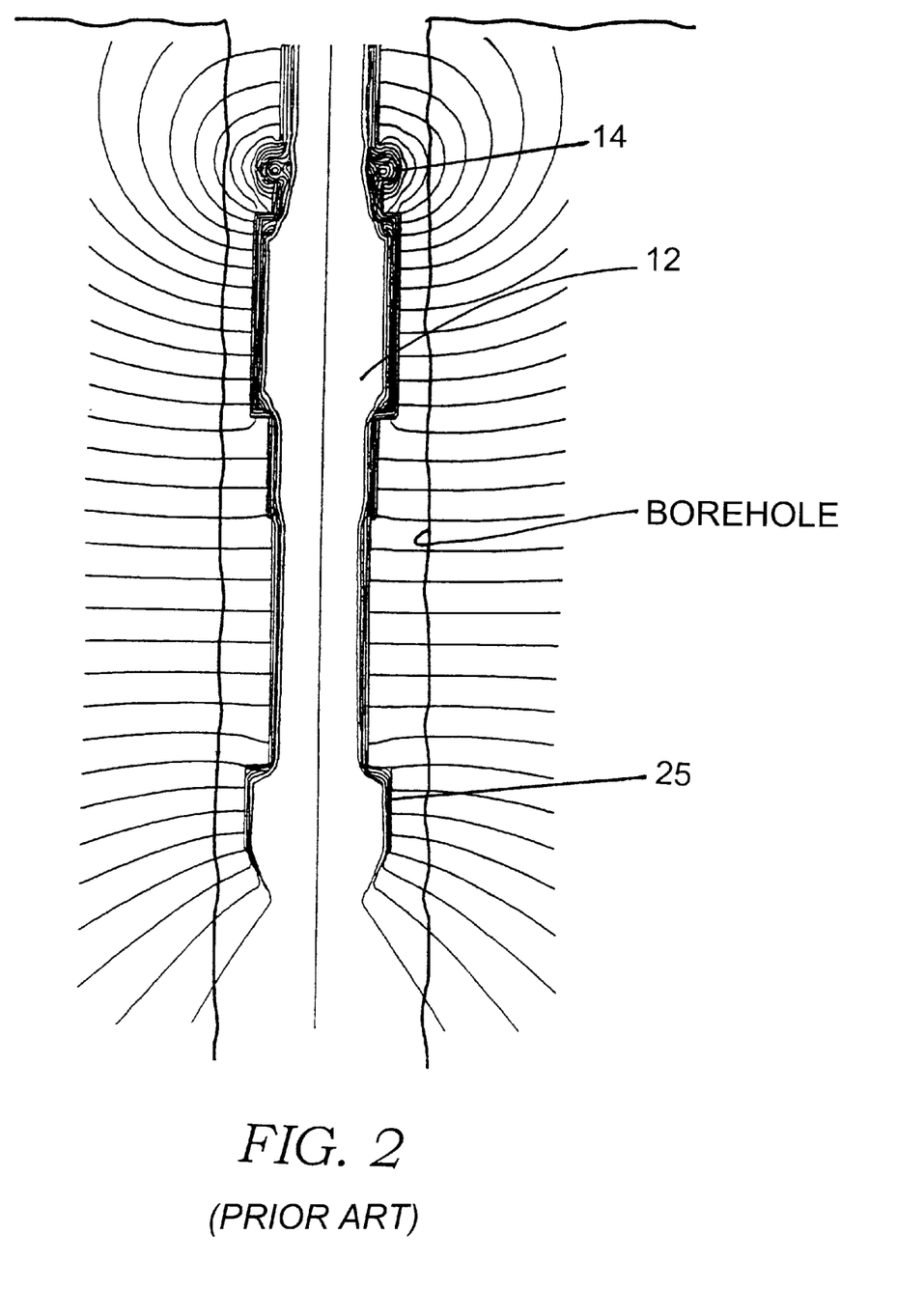
FIG. 2 is a representation of the type of current pattern obtained with the tool embodiment of FIG. 1 and the lower part of a drill string on which the well tool is connected when the transmitting coil is energized.

With the tool 10 disposed in an earth borehole, the transmitter coil 14 induces a voltage on the drill collar 12. The voltage causes current to flow through the formation. FIG. 2 illustrates a general representation of the known type of current pattern that results from energizing the transmitter coil 14 in a well being drilled with mud having substantial conductivity, as described, for example, in U.S. Pat. No. 5,235,285. The pattern will, of course, depend on the formations' bed patterns and conductivities; the example in FIG. 2 represents the simplified case of uniform conductivity.

The generated current travels in a path that includes the drill bit 25 (coupled to the drill collar 12) and earth formations around the drill bit 25. The sensors 18, 20, 22, 24 may be located at arbitrary stations on the tool 10 and are utilized to detect and receive currents transmitted by the transmitter coil 14 which return via the formations and borehole. The sensors 18, 20, 22, 24 provide multiple resistivity measurements, containing different contributions from the current conduction through the formation and borehole fluid. See S. Bonner et al., A New Generation of Electrode Resistivity Measurements for Formation Evaluation While Drilling, SPWLA THIRTY-FIFTH ANNUAL LOGGING SYMPOSIUM, June 1994.

The mentioned tool embodiments contain internal circuitry (not shown) for implementing the disclosed measurements, as described in U.S. Pat. No. 5,339,037. The button sensors 18, 20, 22, ring sensor 24, and receiver coil(s) 16 are each coupled, via sensing and amplification circuits, to a multiplexer (not shown). The output produced by the circuitry is signal data in the form of electrical resistivity values corresponding to the currents received at the sensors.

The resistivity measurements may be focused into the formation and different depths of investigation may be obtained with additional transmitters located on the tool 10 at different distances from the sensors. Longer transmitter-sensor spacings will generate responses that are relatively deep, while the shorter transmitter-sensor spacings will provide relatively shallow responses. By examining the difference in the sensor responses, an estimate of the borehole caliper and formation resistivity can be derived.

The present invention requires the determination of a known borehole fluid parameter. The borehole mud resistivity is used as an input parameter. The mud resistivity can be determined by taking a mud sample at the surface. Corrections for downhole factors such as temperature can be made to the measured mud resistivity by using formulas known in the art. Mud resistivity can also be measured directly downhole with suitable means. Precise measurement of the downhole mud resistivity will improve the accuracy of the present invention.

Figure 3:
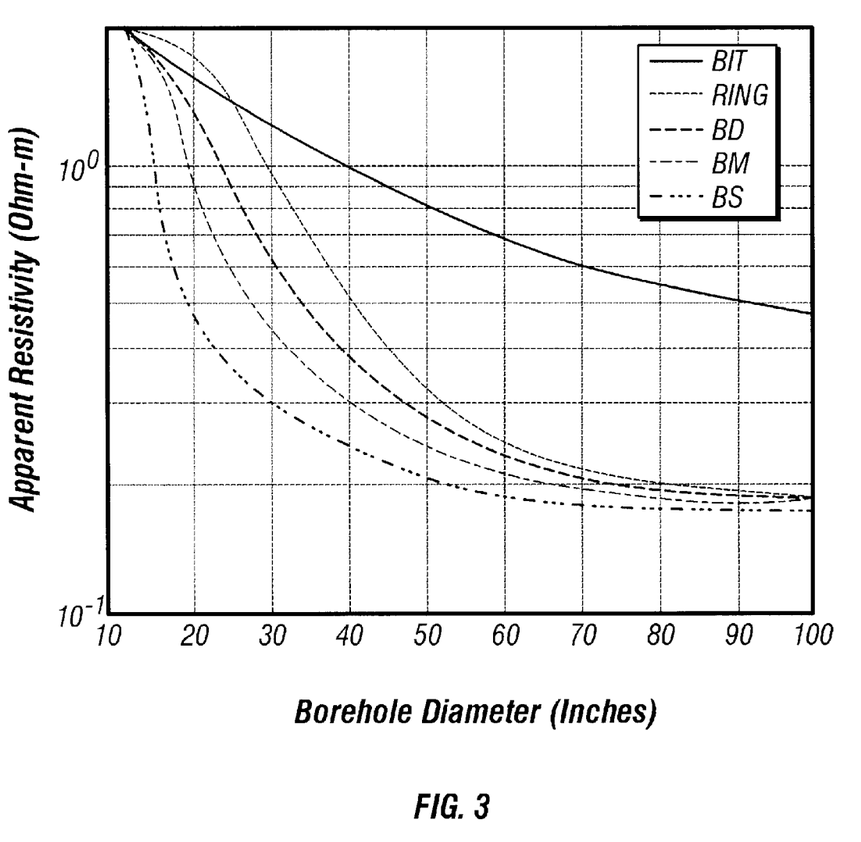
FIG. 3 is a graph of a computed tool response in the form of apparent resistivities versus borehole diameter for a fixed formation and borehole resistivity for five sensor measurements from a tool embodiment. The extent of the curves indicates the depth of measurement obtainable with application of the present invention.

FIG. 3 illustrates the extended borehole diameter Dh measurement range provided by the present invention. FIG. 3 shows a computed tool response (using one of the referenced tool 10 embodiments), representing the depth of measurements obtainable with the disclosed technique. The graph shows the response of the tool's sensors to resistivity measurements in varying borehole diameters Dh with underground conditions comprising 0.2 Ohm-m mud resistivity Rm and a 2.0 Ohm-m formation resistivity Rt. The measurement is borehole corrected assuming a bit size of 12.25 inches. All the measurements start with the formation resistivity Rt at 2.0 Ohm-m and a common borehole diameter Dh of 12.25 inches and end up with a mud resistivity Rm of 0.2 Ohm-m with large borehole diameters Dh. If the borehole diameter Dh were infinite, the sensors would measure only mud, so the measurement should reflect a mud resistivity Rm. For a small borehole, the formation resistivity Rt should be measured. Thus, the greater the diameter of the borehole, the greater the effect of the mud resistivity on the measurement. By observing the effective changes of the measurements versus the borehole diameter Dh, the borehole caliper Dh and formation resistivity Rt can be determined.

As seen in FIG. 3, there is a hierarchy of measurements that extend deeper and deeper into the formation, with the bit measurement providing the furthest depth of investigation. The resistivity measured at the bit is significantly different from the mud resistivity Rm. Even with a borehole diameter Dh of one hundred inches, the bit measurement is still sensitive to the formation resistivity Rt; thus it is still sensitive to borehole sizes up to ten feet.

Implementation of the present invention includes the modeling or pre-calculation of theoretical tool responses corresponding to varying borehole diameters and formation and borehole fluid resistivities. For a laterolog measurement at low frequency, the borehole size and the resistivity contrast between formation and mud resistivity control the deviation of the apparent resistivity of the measurement from the true formation resistivity. A resistivity transform can also be applied, if necessary, to remove the effect of skin depth on the apparent resistivity. As known in the art, the response data can be modeled or computed for a particular tool embodiment by using any suitable computer algorithm (e.g., finite element model coding) to calculate the theoretical current flow for the sensors and converting the data to resistivity values. The modeled response data can be generated and stored in a suitable record medium before or after the tool is disposed in the borehole.

As described above, the downhole mud resistivity Rm is either directly measured with a mud sensor or is estimated from a surface sampling measurement. The formation resistivity Rt varies and is unknown. Effective implementation of the present invention uses at least two different sensor 18, 20, 22, 24 measurements to determine the borehole caliper Dh and the formation resistivity Rt. Any two (or more) tool 10 sensor measurements may be chosen. The accuracy of the output, however, may depend on the sensors chosen.

Once the measurements are taken and the signal data are produced by the tool 10, the signal data and the known mud resistivity Rm value can be compared against the modeled data to find a match. The best match determines the borehole caliper Dh and formation resistivity Rt. The borehole caliper and formation resistivity are thus determined for each pair of measurements by plotting the pair of measurements. Greater accuracy may be obtained by using a least squares technique to match the signal data and mud resistivity Rm value against the modeled data.

With more than two sensor 18, 20, 22, 24 measurements available, a more accurate and stable approach is to formulate a lookup table for all the modeled sensor responses of the particular tool 10 embodiment and then find the borehole caliper Dh and formation resistivity Rt pair that produces the best match between the measured signal data, the known mud resistivity Rm, and the modeled data. Some interpolation between the tabulated values may be done to improve the estimate. Still greater accuracy may be obtained with the pre-calculated tool responses by factoring in the position of the sensors in relation to the bitface in the calculations. This is useful because in MWD techniques, various detection devices are positioned above the drill bit on a downhole toolstring. Thus, the bit measurement may depend on how far away the tool is running from the bitface because the bit measurement uses the whole tool body below the sensor or monitor to conduct electric current.

Figure 4:
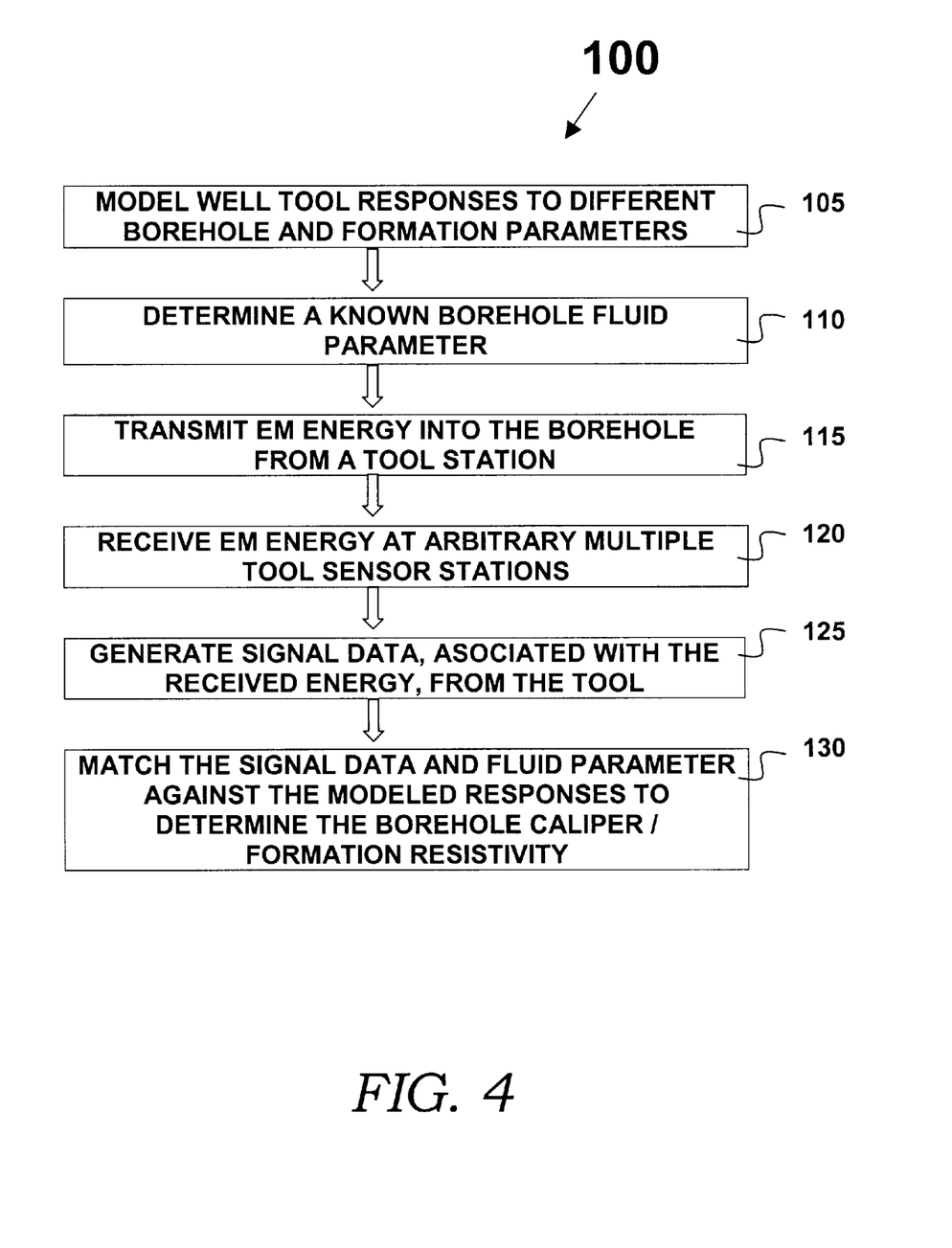
FIG. 4 is a flow diagram of a method for determining the caliper of a borehole in earth formations and/or the resistivity of the formations in accord with the present invention.

FIG. 4 illustrates a flow diagram of a method 100 for determining a caliper of a borehole in an earth formation and/or the formation resistivity utilizing a well tool disposed in the borehole. The method comprises modeling responses of the well tool to different borehole and formation parameters 105; determining a known borehole fluid parameter 110; transmitting electromagnetic energy into the borehole from a station on the tool 115; receiving electromagnetic energy at arbitrary multiple sensor stations on the tool 120; generating signal data, associated with the received energy, from the tool 125; and matching the signal data and the known borehole fluid parameter against the modeled responses to determine the borehole caliper and/or formation resistivity 130.

Program Storage Device

It will be apparent to those of ordinary skill having the benefit of this disclosure that the present invention may be implemented by programming one or more suitable general-purpose computers having appropriate hardware. The programming may be accomplished through the use of one or more program storage devices readable by the computer processor and encoding one or more programs of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here.

Borehole Caliper/Formation Resistivity Calculation System

Figure 5:
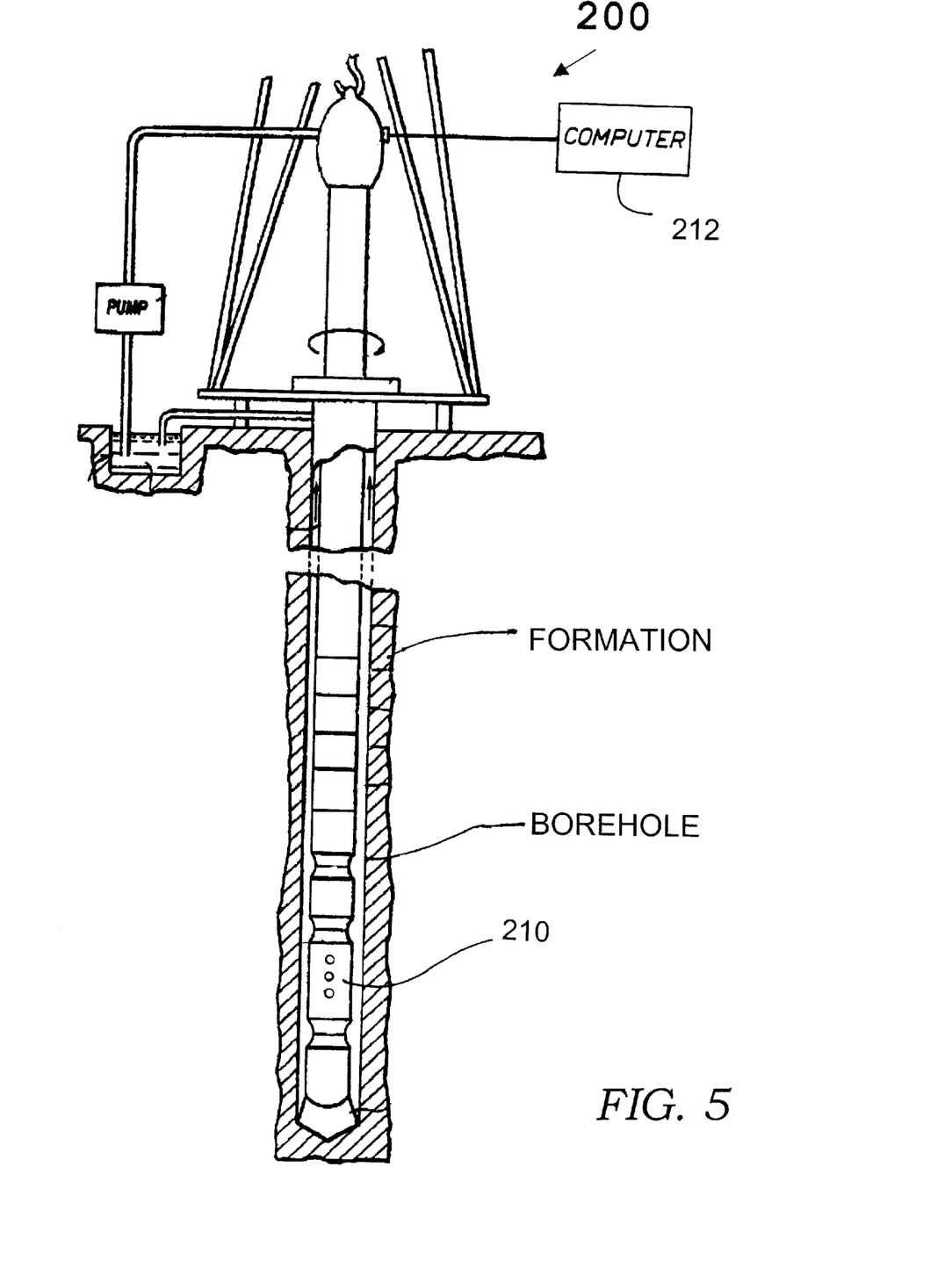
FIG. 5 shows a borehole caliper/formation resistivity calculation system including a well tool and a computer apparatus in accord with the present invention.

As shown in FIG. 5, the present invention may be implemented in a borehole caliper/formation resistivity calculation system 200 with a multi-sensor well tool 210 and an apparatus (such as the general-purpose computer and program storage device is described above) 212 coupled to the tool 210. Certain conventional details are omitted in FIG. 5 for clarity of illustration.

It will be appreciated by those skilled in the art that the present invention may be implemented in LWD or wireline (with the drill string removed) operations with any tool 210 capable of obtaining array electrode resistivity measurements. Thus, although FIG. 5 shows a tool 210 suspended on a platform as used in a LWD operation, the principles of the invention are also applicable to wireline systems as known in the art.

The borehole caliper and/or formation resistivity can be determined in real-time by sending the measured resistivity signal data from the tool 210 to the surface as they are acquired via a telemetry system, or from a recorded mode by recording the signal data on a suitable storage medium (not shown) included in the tool 210 circuitry as described in the '037 patent. Alternatively, some or all processing may be performed downhole with the results being sent to the surface. The signal data may be sent to the surface computer 212 by MWD telemetry or along a wireline cable as known in the art. It will be understood that alternative means may be employed for communicating the acquired data to the surface, as the precise form of communication is immaterial to the implementation of the present invention.

The surface computer 212 may be programmed to receive the resistivity signal data and the mud resistivity Rm value as inputs. It may also be capable of generating and/or storing the modeled tool 210 response data. The computer 212 may also be programmed to process the signal data, the borehole mud resistivity Rm, and the modeled data to determine the borehole caliper Dh and/or the formation resistivity Rt in accordance with the disclosed techniques. Once determined, the borehole caliper Dh and/or formation resistivity Rt can be recorded on a suitable storage medium or further processed as desired by the user to generate a borehole caliper or formation resistivity profile.

Plotted Examples

Figure 6:
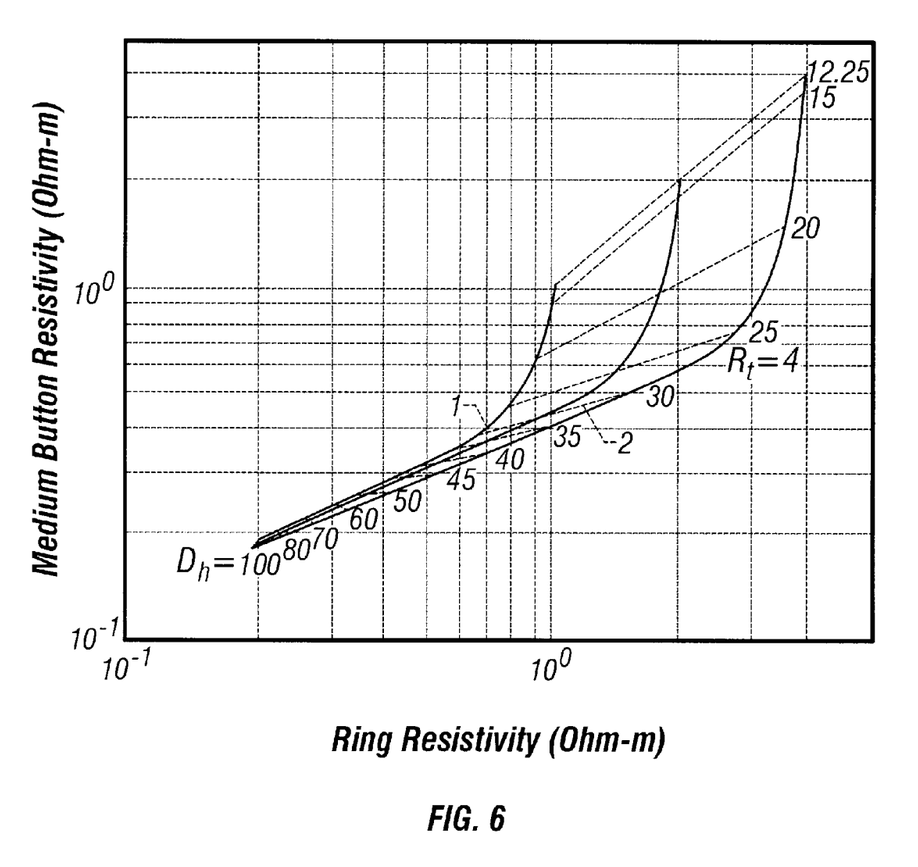
FIG. 6 is a computed crossplot of resistivity measurements obtained from two well tool sensors in accord with the present invention. The caliper and formation resistivity can be read off the chart given two measurements.

In this section, computed crossplots of sensor resistivity measurements and the output of borehole caliper and formation resistivity calculations derived in accordance with the present invention are presented. FIG. 6 shows a computed crossplot of resistivity measurements obtained from a tool's ring sensor and center button sensor. As described above, any two sensor measurements may be chosen. The ring and center sensors were chosen here for purposes of example. Looking at the crossplot of FIG. 6, the solid curves represent constant formation resistivities Rt and the dashed curves constant borehole calipers. A borehole caliper and formation resistivity can be determined from the crossplot by inputting two measurements. That is, a borehole diameter Dh and a formation resistivity Rt can be derived from a known mud resistivity Rm and two given measured resistivity values.

Figure 7:
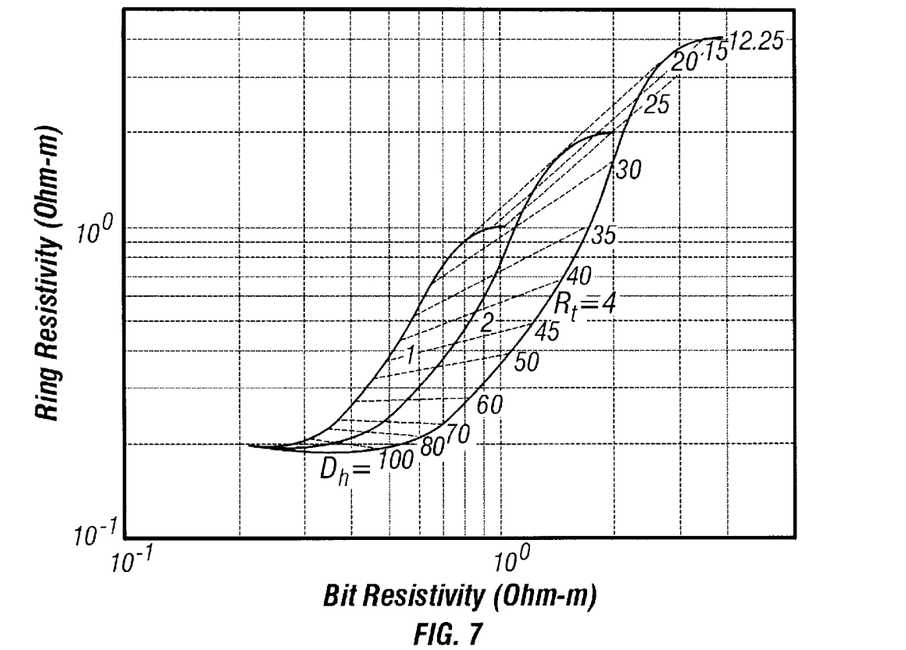
FIG. 7 is another computed crossplot of resistivity measurements obtained from another two well tool sensors in accord with the present invention. The caliper and formation resistivity can be read off the chart given two measurements.

FIG. 7 shows another computed resistivity crossplot illustrating the different sensitivities obtainable by choosing current measurements taken from sensors at different tool stations. The ring sensor and bit measurements were chosen for the crossplot in FIG. 7. As seen from comparison of FIGS. 6 and 7, differing ranges of sensitivity are provided from measurements at different sensor stations. Depending on which sensor measurements are chosen, a greater error may be incurred when determining the borehole caliper from the areas of lower sensitivity, as represented by the crowding of the lines in the crossplots.

Figure 8:
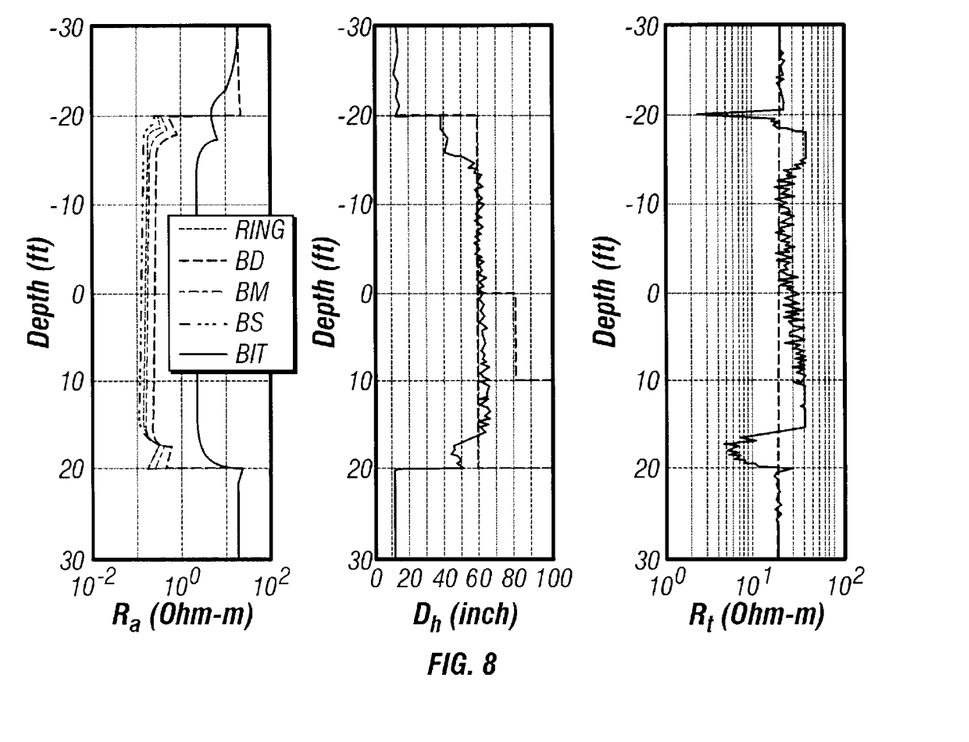
FIG. 8 graphically illustrates a calculated borehole caliper and formation resistivity output obtained with application of the present invention. The Left panel displays the apparent resistivity of a well tool in a modeled formation configuration. The middle panel displays the resultant caliper output from application of the present invention. The right panel displays the formation resistivity. The input parameters are shown as dashed curves and the output from application of the present invention is displayed as solid curves.

FIG. 8 illustrates the calculated borehole caliper Dh and formation resistivity Rt outputs obtained with the techniques of the present invention. The left panel is the computed resistivity log that was used as input signal data. Each curve represents a resistivity measurement from a different sensor. A 5% white noise factor was added to the resistivity inputs. The input mud resistivity Rm was set at 0.2 Ohm-m. The borehole is enlarged to sixty inches in the [−20 ft., 20 ft.] interval.

Turning to the center and right panels of FIG. 8, the respective input borehole diameter Dh and formation resistivities Rt are shown as dashed curves. As seen in the center panel, the correct borehole calipers Dh are obtained, with an exception at the edge where shoulder beds begin to affect the log readings. The formation resistivity Rt output is also very close, displaying less accuracy for larger boreholes because of the insensitivity of the apparent resistivity to the formation resistivity. The dashed line labeled "Di" in the center panel represents a mud filtrate invasion. Filtrate consists of fluids driven into the rock formation under the high-pressure conditions encountered downhole. As shown in the output, if the invasion is not too large (here it is in the range of twenty inches), the disclosed techniques provide the correct borehole caliper Dh and formation resistivity Rt.

Figure 9:
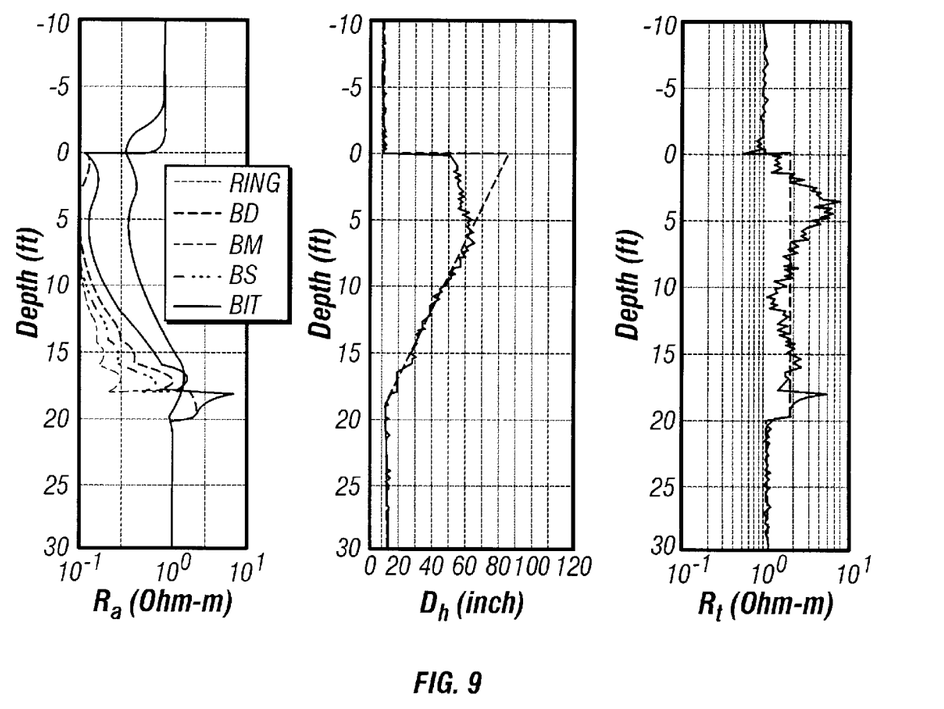
FIG. 9 graphically illustrates a calculated borehole caliper and formation resistivity output, as applied to a cone-shaped borehole, obtained with application of the present invention. The designations of the curves are the same as the curves of FIG. 8.

FIG. 9 illustrates the calculated borehole caliper Dh and formation resistivity Rt outputs obtained with the technique of the present invention as applied to a cone-shaped borehole. As seen in the panels, the borehole calipers Dh are once again correctly obtained, with an exception at the top edge where the shoulder bed began to affect the tool response.

The accuracy of the disclosed caliper and formation resistivity calculation techniques was computed for different values of Rt/Rm contrasts and different borehole diameters. Assuming a plus or minus 5% sensor measurement accuracy, the borehole calipers and formation resistivities can be determined within 10% of accuracy for boreholes extending up to one-hundred inches in diameter. Additional error may be incurred from the uncertainty of the mud resistivity in downhole environments.

While the methods and apparatus of this invention have been described as specific embodiments, it will be apparent to those skilled in the art that variations may be applied to the structures and in the steps or in the sequence of steps of the methods described herein without departing from the concept and scope of the invention. All such similar variations apparent to those skilled in the art are deemed to be within this concept and scope of the invention as defined by the appended claims.

What is claimed is:

1. A method for determining a caliper of a borehole in an earth formation utilizing a well tool disposed in the borehole, comprising:
   a) modeling responses of the tool to different borehole and formation parameters;
   b) determining a borehole fluid parameter;
   c) inducing a voltage along the tool to produce a current whose path includes the tool and the formation;
   d) receiving electromagnetic energy at arbitrary sensor stations on the tool;
   e) generating signal data associated with the received energy; and
   f) matching the signal data and the borehole fluid parameter against the modeled responses to determine the borehole caliper.

2. The method of claim 1, wherein the method is performed during or after drilling of the borehole.

3. The method of claim 1, wherein the known borehole fluid parameter comprises a mud resistivity value.

4. The method of claim 1, wherein the generated signal data comprises electrical resistivity values.

5. The method of claim 1, further comprising recording the determined borehole caliper on an output record medium.

6. The method of claim 1, wherein step (f) comprises performing a least squares minimization technique to match the generated signal data and the known fluid parameter against the modeled responses.

7. The method of claim 1, wherein step (a) comprises establishing a table of theoretical model responses of the well tool to different borehole diameters, borehole fluid resistivities, and formation resistivities.

8. The method of claim 1, wherein step (e) comprises sending the signal data from the tool to a surface of the formation.

9. The method of claim 1, wherein step (e) comprises recording the signal data in a storage medium housed in the tool.

10. A method for determining the resistivity of an earth formation, the formation being traversed by a borehole, utilizing a well tool disposed in the borehole, comprising:
    a) modeling responses of the tool to different borehole and formation parameters;
    b) determining a borehole fluid parameter;
    c) inducing a voltage along the tool to produce a current whose path includes the tool and the formation;
    d) receiving electromagnetic energy at arbitrary sensor stations on the tool;
    e) generating signal data associated with the received energy; and
    f) matching the signal data and the borehole fluid parameter against the modeled responses to determine the formation resistivity.

11. The method of claim 10, wherein the method is performed during or after drilling of the borehole.

12. The method of claim 10, wherein the known borehole fluid parameter comprises a mud resistivity value.

13. The method of claim 10, wherein the generated signal data comprises electrical resistivity values.

14. The method of claim 10, further comprising recording the determined formation resistivity on an output record medium.

15. The method of claim 10, wherein step (f) comprises performing a least squares minimization technique to match the generated signal data and the known fluid parameter against the modeled responses.

16. The method of claim 10, wherein step (a) comprises establishing a table of theoretical model responses of the well tool to different borehole diameters, borehole fluid resistivities, and formation resistivities.

17. The method of claim 10, wherein step (e) comprises sending the signal data from the tool to a surface of the formation.

18. The method of claim 10, wherein step (e) comprises recording the signal data in a storage medium housed in the tool.

19. A borehole caliper calculation system including a multi-sensor well tool and an apparatus adapted for coupling to the well tool, the tool being adapted to induce a voltage along its body to produce a current whose path includes the tool and the formation and to receive electromagnetic energy at said sensors, the apparatus being adapted to respond to signal data associated with the received energy, the apparatus comprising:
    means for receiving the signal data;
    means for receiving a borehole fluid parameter;
    means for storing modeled well tool response data; and
    means for processing the signal data, the fluid parameter, and the modeled response data to determine the borehole caliper.

20. The system of claim 19, wherein the well tool transmits and receives the electromagnetic energy and generates the signal data during one of a measurement-while-drilling or wireline operation.

21. The system of claim 19, wherein the known borehole fluid parameter comprises a mud resistivity value.

22. The system of claim 19, wherein the generated signal data comprises electrical resistivity values.

23. The system of claim 19, the apparatus further comprising means for recording the determined borehole caliper on an output record medium.

24. The system of claim 19, the means for storing modeled tool response data further comprising means for establishing a table of theoretical model responses of the well tool to different borehole diameters, borehole fluid resistivities, and formation resistivities.

25. The system of claim 19, the processing means further comprising means for matching the signal data and the known fluid parameter against the modeled response data to determine the borehole caliper.

26. The system of claim 19, the processing means further comprising means for performing a least squares minimization technique to match the signal data and the known fluid parameter against the modeled response data to determine the borehole caliper.

27. A program storage device readable by a processor and encoding a program of instructions including instructions for performing the apparatus operations recited in claim 19.

28. An earth formation resistivity calculation system including a multi-sensor well tool and an apparatus adapted for coupling to the well tool, the tool being adapted to induce a voltage along its body to produce a current whose path includes the tool and the formation and to receive electromagnetic energy at said sensors, the apparatus being adapted to respond to signal data associated with the received energy, the apparatus comprising:
    means for receiving the signal data;
    means for receiving a borehole fluid parameter;

means for storing modeled well tool response data; and means for processing the signal data, the fluid parameter, and the modeled response data to determine the formation resistivity.

29. The system of claim 28, wherein the well tool transmits and receives the electromagnetic energy and generates the signal data during one of a measurement-while-drilling or wireline operation.

30. The system of claim 28, wherein the known borehole fluid parameter comprises a mud resistivity value.

31. The system of claim 28, wherein the generated signal data comprises electrical resistivity values.

32. The system of claim 28, the apparatus further comprising means for recording the determined formation resistivity on an output record medium.

33. The system of claim 28, the means for storing modeled tool response data further comprising means for establishing a table of theoretical model responses of the well tool to different borehole diameters, borehole fluid resistivities, and formation resistivities.

34. The system of claim 28, the processing means further comprising means for matching the signal data and the known fluid parameter against the modeled response data to determine the formation resistivity.

35. The system of claim 28, the processing means further comprising means for performing a least squares minimization technique to match the signal data and the known fluid parameter against the modeled response data to determine the formation resistivity.

36. A program storage device readable by a processor and encoding a program of instructions including instructions for performing the apparatus operations recited in claim 28.

* * * * *